United States Patent
Kumagai et al.

(10) Patent No.: US 7,372,239 B2
(45) Date of Patent: May 13, 2008

(54) MULTI-OUTPUT TYPE DC/DC CONVERTER (75) Inventors: Keizo Kumagai, Atsugi (JP); Yuji Yamanaka, Atsugi (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 0 days.

(21) Appl. No.: 11/729,419

(22) Filed: Mar. 28, 2007

(65) Prior Publication Data

US 2007/0252563 A1 Nov. 1, 2007

(30) Foreign Application Priority Data

Apr. 26, 2006 (JP) .............................. 2006-121593

(51) Int. Cl.
*F05F 1/577* (2006.01)
(52) U.S. Cl. ....................... 323/267; 323/206; 323/285
(58) Field of Classification Search ................ 323/206, 323/225, 267, 271, 282, 284, 285, 290
See application file for complete search history.

(56) References Cited

U.S. PATENT DOCUMENTS 6,204,650 B1 * 3/2001 Shimamori ................. 323/267
6,452,367 B2 * 9/2002 Watanabe ................... 323/267
7,081,741 B2 * 7/2006 Ishii et al. ................. 323/267

FOREIGN PATENT DOCUMENTS

JP        2005-117886 A      4/2005

\* cited by examiner

*Primary Examiner*—Jessica Han
(74) *Attorney, Agent, or Firm*—Frishauf, Holtz, Goodman & Chick, P.C.

(57) ABSTRACT

Disclosed a multi-output type DC/DC converter including: a reactor connected to a direct-current power supply; a first switching circuit composed of switches to apply a current to the reactor; a second switching circuit composed of switches to switch an output from the reactor to any one of output terminals; output voltage detection sections to detect voltages of the output terminals; comparison circuits to compare outputs with a waveform signal of a predetermined frequency; and an output selection circuit to receive inputs form comparison circuits, and to select an output of a comparison circuit, the output having the earliest rise or the earliest fall, so as to generate a control signal pertaining to on and off of the first and/or second switching circuit, wherein a current generated by a discharge of energy accumulated in the reactor is output to any one of the terminals in accordance with the control signal.

7 Claims, 9 Drawing Sheets

MULTI-OUTPUT TYPE DC/DC CONVERTER

BACKGROUND OF THE INVENTION

1. Field of the Invention

The present invention relates to a switching power supply apparatus and a multi-output type DC/DC converter outputting a plurality of voltages from one input voltage, and more particularly to a DC/DC converter provided with a selection circuit for switching output currents according to the level of each voltage output.

2. Description of Related Art

There is a DC/DC converter as a power supply apparatus converting a direct-current input voltage into a direct-current voltage of an electric potential different from that of the input voltage to output the converted direct-current voltage. Moreover, there is a circuit shown in FIG. 9 as a multi-output type DC/DC converter outputting a plurality of direct-current voltages having different electric potentials from one direct-current input. Such a multi-output type DC/DC converter is disclosed in, for example, Japanese Patent Application Publication Laid-open No. 2005-117886.

Figure 9:
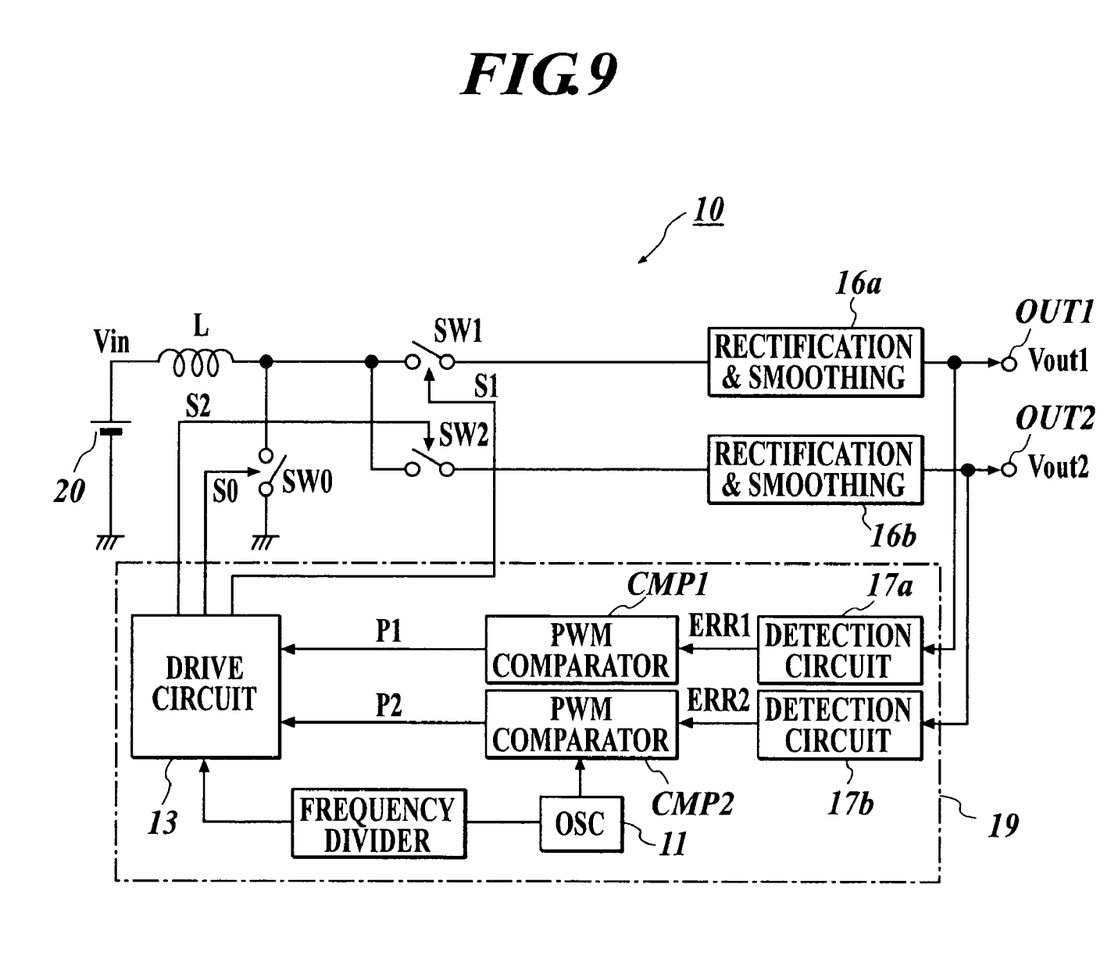
FIG. 9 is a configuration diagram showing an example of a conventional multi-output type DC/DC converter.

The DC/DC converter shown in FIG. 9 turns on and off a main switch SW0 based on a pulse P1 or a pulse P2, which are output from comparators CMP1 and CMP2, respectively, and the DC/DC converter selectively turns on any one of change-over switches SW1 and SW2 at a predetermined period based on the output of a frequency divider to apply the output current of an inductor (reactor) L to a rectification & smoothing circuit 16a or 16b in a time division method. Thereby, the DC/DC converter outputs direct-current voltages Vout1 and Vout2, which have been converted to voltages having desired levels severally, from a first output terminal OUT1 and a second output terminal OUT2.

Because the multi-output type DC/DC converter as shown in FIG. 9 is configured to switch the output current of the inductor L by the time division method, the multi-output type DC/DC converter has the advantages of being capable of decreasing the number of inductors, and of being capable of attaining the miniaturization of the direct-current power supply apparatus. However, because the multi-output type DC/DC converter of FIG. 9 distributes the output current of the inductor L to the first output terminal OUT1 and the second output terminal OUT2 at a predetermined period (fixed), the multi-output type DC/DC converter has a problem of the difficulty of keeping the desired electric potentials if the current ratio of the loads connected to the respective two output terminals greatly changes.

To put it concretely, for example, there is examined the case where, in a system using a multi-output type DC/DC converter the period of the time division method of which has been designed on the supposition that the ratio of the consumption current of the load connected to the first output terminal OUT1 to the consumption current of the load connected to the second output terminal OUT2 is 2 to 1, the ratio of the consumption current of the load of the first output terminal OUT1 to the consumption current of the load of the second output terminal OUT2 is suddenly reversed to be 1 to 2. In this case, if the period of the time division method is fixed, there is the possibility of producing the situation in which the output voltage Vout2 of the second output terminal OUT2, the load of which has increased, does not reach a desired electric potential, and on the other hand in which the output voltage Vout1 of the first output terminal OUT1, the load of which has decreased, becomes higher than the desired electric potential.

SUMMARY OF THE INVENTION

It is an object of the present invention to provide a multi-output type DC/DC converter that intermittently applies an input voltage to a reactor (inductor) to flow a current and distributes the output from the reactor to a plurality of output terminals by a time division method for outputting a plurality of voltages, the multi-output type DC/DC converter capable of preventing the output voltages from greatly shifting from desired electric potentials owing to load fluctuations to output stable direct-current voltages.

In order to attain the object mentioned above, the present invention provides an output selection circuit that monitors the outputs of comparison circuits to select the earliest output so that it is possible to generate on-off control signals of switching circuits switching the path of a current flowing through a reactor in a multi-output type DC/DC converter including an output voltage detection section and a comparison circuit (PWM comparator) to each output.

To put it more concretely, a multi-output type DC/DC converter comprises: a reactor connected to a direct-current power supply; a first switching circuit composed of one or two switches or more to apply a current to the reactor; a second switching circuit composed of one or two switches or more to switch an output from the reactor to any one of a plurality of output terminals; a plurality of output voltage detection sections to detect voltages of the plurality of output terminals; a plurality of comparison circuits to compare outputs of the plurality of output voltage detection sections with a waveform signal of a predetermined frequency; and an output selection circuit to receive outputs of the plurality of comparison circuits as inputs, and to select an output of a comparison circuit, the output having the earliest rise or the earliest fall, so as to generate a control signal pertaining to on and off of the first switching circuit and/or the second switching circuit, wherein a current generated by a discharge of energy accumulated in the reactor is output to any one of the plurality of output terminals in accordance with the control signal generated by the output selection circuit.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

In the following, the preferred embodiments of the present invention will be described, referring to the drawings.

Figure 1:
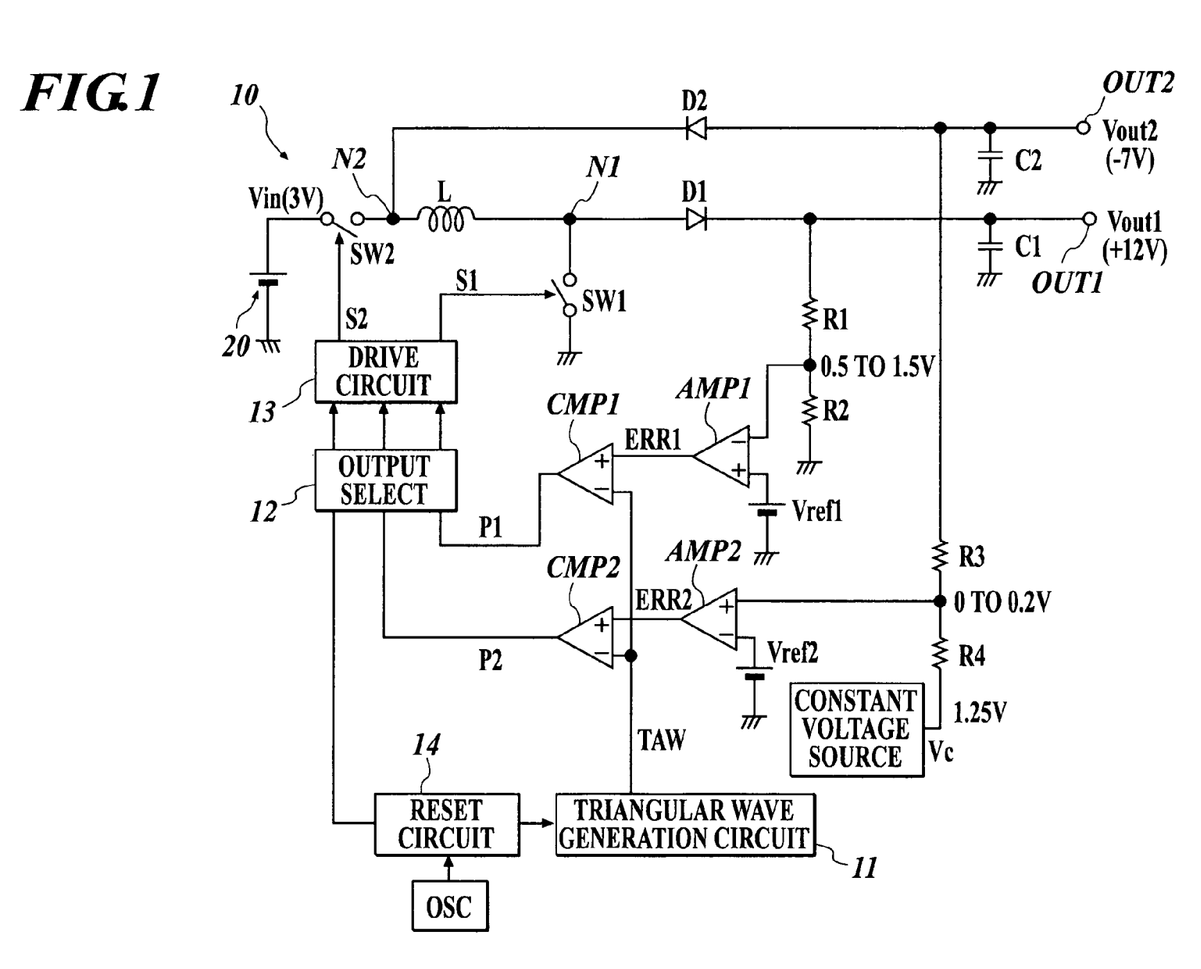
FIG. 1 is a configuration diagram showing a multi-output type DC/DC converter of a first embodiment of the present invention.

FIG. 1 is a configuration diagram showing a multi-output type DC/DC converter of a first embodiment of the present invention.

The multi-output type DC/DC converter 10 of the embodiment is a boost & inverting converter. The boost & inverting converter turns on switches SW1 and SW2, which are constructed of transistors such as a MOSFET, to apply an input voltage Vin from a direct-current power supply 20 to a reactor L for flowing an current therethrough. The boost & inverting converter thus applies a current to flow on the output side from the reactor L to perform voltage output. The multi-output type DC/DC converter 10 outputs two kinds of output voltages Vout1 and Vout2 to two output terminals OUT1 and OUT2, respectively, by switching of the switches in the above boost & inverting converter.

The multi-output type DC/DC converter 10 of the embodiment includes the reactor L accumulating electric energy, a switch SW2 provided between the direct-current power supply 20 and the reactor L for applying an input voltage Vin to the reactor L intermittently by the on-off action of the switch SW2, a first diode D1 connected between the reactor L and the first output terminal OUT1 in the forward direction of the diode D1, a second diode D2 connected between a connection node N2 of the switch SW2 and the reactor L and the second output terminal OUT2 in the backward direction of the diode D2, a switch SW1 connected between a connection node N1 of the reactor L and the first diode D1 and the ground, and smoothing capacitors C1 and C2 connected between the output terminals OUT1 and OUT2 and the ground, respectively.

The converter 10 accumulates energy into the reactor L by turning on the switches SW1 and SW2, and outputs a boosted voltage Vout1 to the output terminal OUT1 by turning off the switch SW1. Moreover, the converter 10 accumulates energy into the reactor L by turning on the switches SW1 and SW2, and outputs an inverse voltage (negative voltage) Vout2 to the output terminal OUT2 by turning off the switches SW1 and SW2. To put it concretely, the converter 10 is configured so as to output, for example, the output voltage Vout1 of +12 V and the output voltage Vout2 of -7 V to the input voltage Vin of 3 V by the PWM switching control of the switches SW1 and SW2.

Moreover, the DC/DC converter 10 of the embodiment includes divided resistances R1 and R2 connected between the output terminal OUT1 and the ground in series in order to detect the level of the output voltage Vout1, divided resisters R3 and R4 connected between the output terminal OUT2 and a terminal to which a constant voltage Vc is applied in series in order to detect the level of the output voltage Vout2, and error amplifier circuits AMP1 and AMP2 comparing the detected voltages with predetermined reference voltages Vref1 and Vref2, respectively, to output voltages according to electric potential differences.

Furthermore, the DC/DC converter 10 includes a triangular wave generation circuit 11 generating a triangular wave TAW of a predetermined frequency, the PWM comparators CMP1 and CMP2 comparing the generated triangular wave with the outputs ERR1 and ERR2 of the error amplifier circuits AMP1 and AMP2, respectively, to generate PWM control pulses P1 and P2, respectively, an output selection circuit 12 selecting an output pulse having an earlier rise between the outputs of these comparators CMP1 and CMP2 to generate the control signals for turning on and off of the switches SW1 and SW2, respectively, according to the selected pulse, and a drive circuit (driver) 13 generating on-off drive signals S1 and S2 according to the control signals from the output selection circuit 12, respectively, to apply.the generated on-off drive signals S1 and S2 to the switches SW1 and SW2, respectively. Furthermore, the DC/DC converter 10 includes a reset circuit 14 prescribes the timing of the changing points of the triangular wave TAW to be generated by giving resets to the triangular wave generation circuit 11 based on an oscillation signal from an oscillation circuit OSC, which reset circuit 14 further resets the output selection circuit 12 in synchronization with the triangular wave TAW.

The resistance values of the divided resistances R1 and R2 for detecting the output voltage Vout1 are set so that a voltage within the range of from 0.5 V to 1.5 V may be input into the error amplifier circuit AMP1 when a constant voltage of, for example, 1.25 V is applied to the resister R2 and the output voltage Vout1 is changing within the range of from 10 V to 15 V. Moreover, the resistance values of the divided resisters R3 and R4 for detecting the output voltage Vout2 are set so that a voltage within the range of from 0 V to 0.2 V may be input into the error amplifier circuit AMP2 when the output voltage Vout2 is changing within the range of from -5 V to -9 V.

Figure 2:
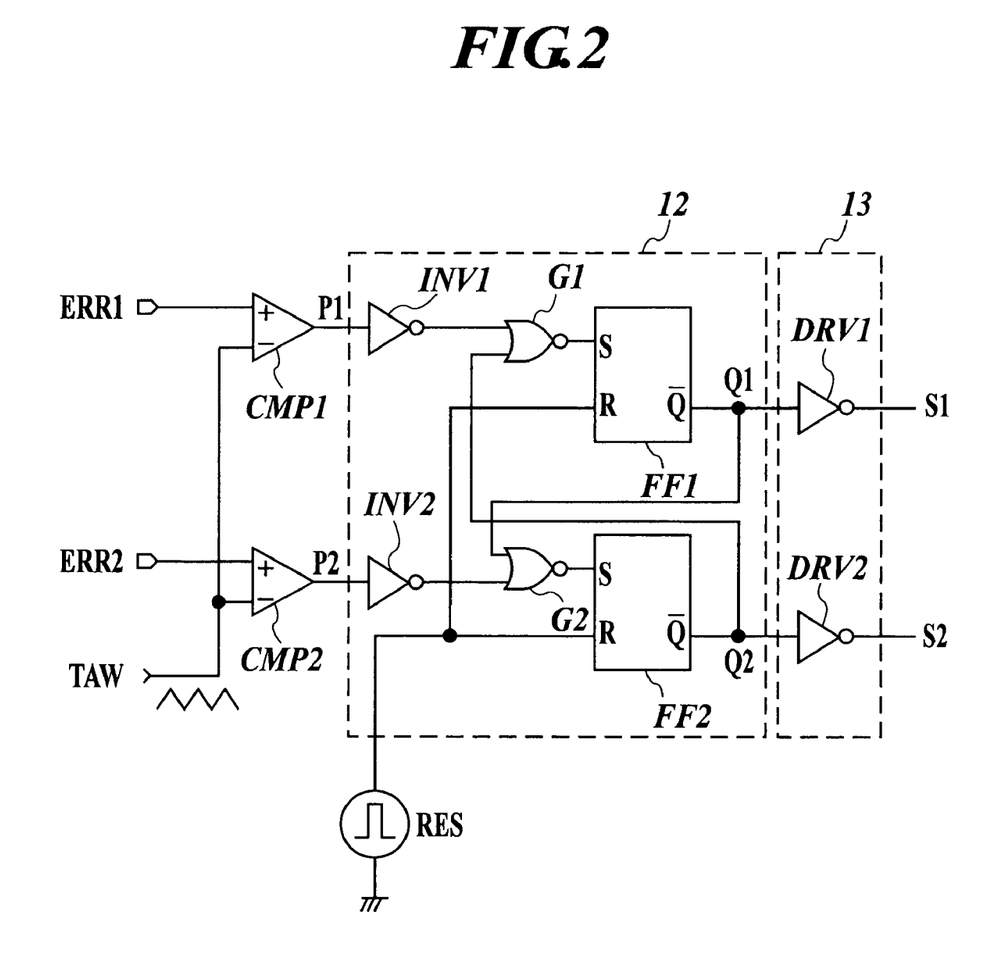
FIG. 2 is a block diagram showing a more concrete configuration of an output selection circuit of the multi-output type DC/DC converter of the first embodiment.

FIG. 2 shows a concrete configuration example of the output selection circuit 12.

The output selection circuit 12 is composed of inverters INV1 and INV2 inverting the PWM control pulses P1 and P2, which are the respective outputs of the PWM comparators CMP1 and CMP2, NOR logic gate circuits G1 and G2, to one input terminal of each of which each of the outputs of the inverters INV1 and INV2 is input, respectively, and flip-flops FF1 and FF2, to the set terminals S of which each of the outputs of the NOR logic gate circuits G1 and G2 is input, respectively, and to the reset terminals R of which a reset signal RES from the reset circuit 14 are commonly input. Then, the output terminals of the flip-flops FF1 and FF2 are crossly joined with the other input terminals of the NOR logic gate circuits G2 and G1, respectively, and thereby the output selection circuit 12 operates as the selection circuit that selects any earlier risen output pulse of the PWM control pulses P1 and P2 to output the selected pulse and intercepts the other later risen output pulse. The outputs of the flip-flops FF1 and FF2 are inverted by the drivers DRV1 and DRV2, respectively, which drivers DRV1 and DRV2 are severally constructed of an inverter having a strong drive force, and the inverted outputs are output as on-off drive signals S1 and S2 of the switches SW1 and SW2, respectively.

Figure 3:
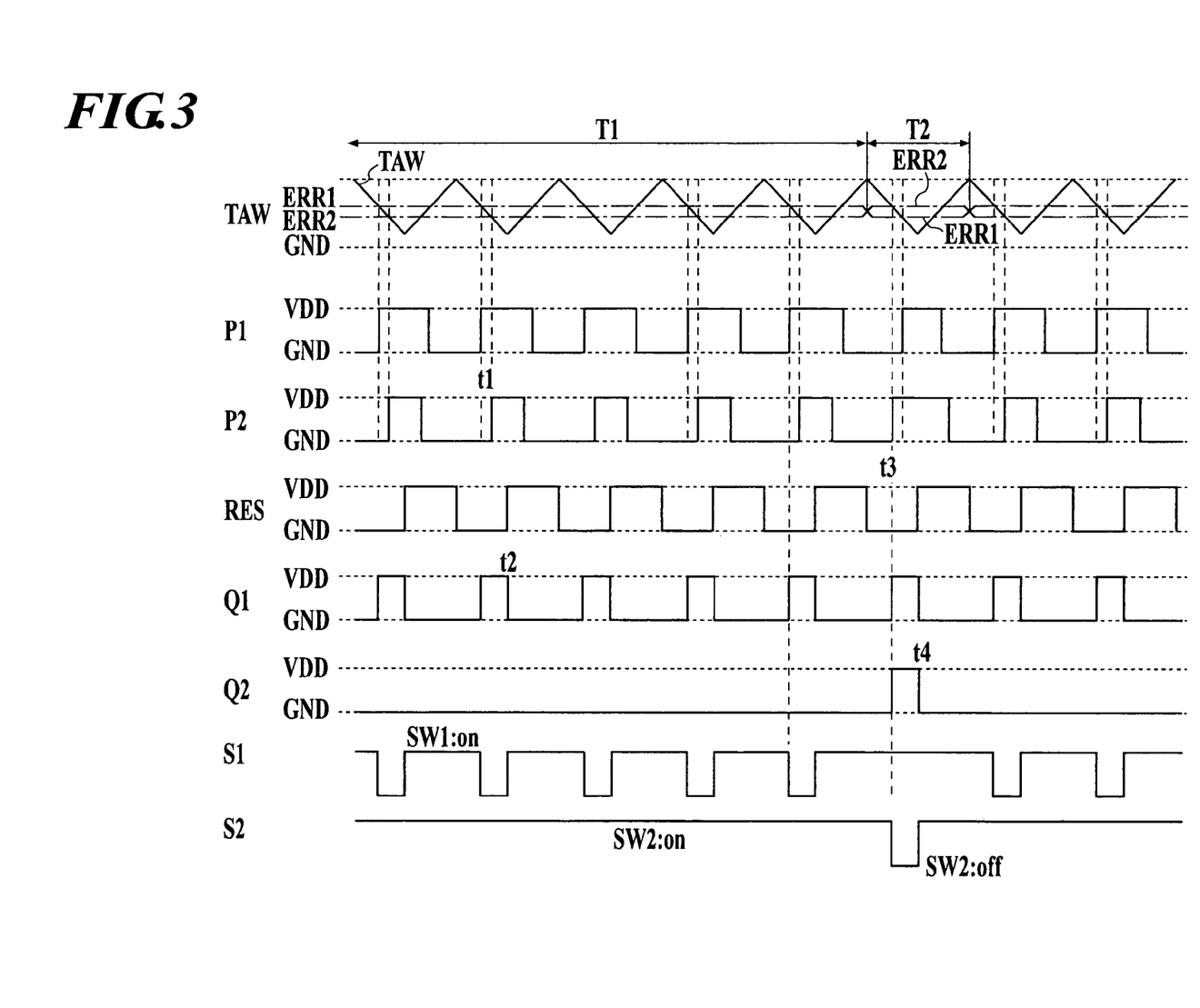
FIG. 3 is a timing chart showing the details of the changes of a reactor current.

Next, the operations of the DC/DC converter 10 of the above embodiment are described using the timing chart of FIG. 3. FIG. 3 shows the changes of the signals at each section in the case of the changes of: the output ERR1 of the error amplifier circuit AMP1 is first higher than the output ERR2 of the error amplifier circuit AMP2; the outputs ERR1 and ERR2 are reversed in the middle of the changes so that the output ERR2 of the error amplifier circuit AMP2 becomes higher than the output ERR1 of the error amplifier circuit AMP1; and then the output ERR1 of the error amplifier circuit AMP1 becomes higher than the output ERR2 of the error amplifier circuit AMP2 again. In the period T1 during which the output ERR1 of the error amplifier circuit AMP1 is higher than the output ERR2 of the error amplifier circuit AMP2, the level of the triangular wave TAW first reaches the output ERR1 of the error amplifier circuit AMP1 when the level falls. Consequently, the output pulse P.1 priorly changes to the high level between the output pulses P1 and P2 of the PWM comparators CMP1 and CMP2, respectively, (timing t1).

Thereby, the flip-flop FF1 is priorly made to be in the state of being set, and the output Q1 thereof changes to the high level. The NOR gate circuit G2 is thereupon closed by the output Q1 of the flip-flop FF1, and the flip-flop FF2 becomes the state of not being set even if the output pulse P2 of the PWM comparator CMP2 is input. Then, the output Q2 of the flip-flop FF2 stays in the low level. The output Q1 of the flip-flop FF1, which has changed to the high level, is changed to the low level in synchronization with a rise of the reset signal RES (timing t2).

The timing t2 agrees with the lower vertex of the triangular wave TAW. The drive signal S1 is made to the low level in response to the change of the output Q1 to the high level, and thereby the switch SW1 is turned off. Then, the current flowing through the reactor L is made to flow to the output terminal OUT1 through the diode D1, and thereby the boosted voltage Vout1 is output. When the output ERR1 is higher than the output ERR2, the higher the output ERR1 is, the wider the pulse width of the output Q1 of the flip-flop FF1, i.e. the pulse width of the negative drive signal S1, which is the output of the driver DRV1, of the switch SW1 is made to be. Moreover, the lower the output ERR1 is, the narrower the negative pulse width of the drive signal S1 of the switch SW1 is made to be. Thereby, the converter 10 is configured to make feedback work so as to lessen the change of the output voltage Vout1 when the output voltage Vout1 changes.

When the switch SW1 is repeatedly turned off and the boosting operation is continuously performed as in the period T1, electric charges are not supplied to the smoothing capacity C2, and consequently the output voltage Vout2 gradually rises (the absolute value thereof decreases). Then, as shown in the period T2 of FIG. 3, the output ERR2 of the error amplifier circuit AMP2 becomes higher than the output ERR1 of the error amplifier circuit AMP1. In this period, because the level of the triangular wave TAW first reaches the output ERR2 of the error amplifier circuit AMP2 when the level falls, the output pulse P2 between the output pulses P1 and P2 of the PWM comparators CMP1 and CMP2, respectively, is led to priorly change to the high level (timing t3).

Thereby, the flip-flop FF2 is priorly made to be in the set state thereof, and the output Q2 thereof changes to the high level. Thereupon, the NOR gate circuit G1 is closed by the output Q2 of the flip-flop FF2, and the flip-flop FF1 is made to be not set even if the output pulse P1 of the PWM comparator CMP1 is input. Consequently, the output Q1 of the flip-flop FF1 stays at the low level. The output Q2 of the flip-flop FF2, which has changed to the high level, is changed to the low level in synchronization with a rise of the reset signal RES (timing t4). The timing t4 agrees with the lower vertex of the triangular wave TAW. The drive signal S2 is changed to the low level in response to the change of the output Q2 to the high level, and thereby the switch SW2 is turned off. Then, the current flowing through the reactor L operates so as to draw therein a current from the output terminal OUT2 through the diode D2, and thereby a lower inverted voltage Vout2 is output.

When the voltage Vout2 falls to allow the output ERR1 of the error amplifier circuit AMP1 to be higher than the output ERR2 of the error amplifier circuit AMP2, the output pulse P1 of the PWM comparator CMP1 comes to priorly change to the high level, and the flip-flop FF1 is priorly made to the set state thereof. Then, the output Q1 changes to the high level, and the drive signal S1 is changed to the low level in response to the change of the output Q1 to the high level. Thereby, the switch SW1 is turned off, and the current flowing through the reactor. L is made to flow to the output terminal OUT1 through the diode D1. Thus, the boosted voltage Vout1 is led to be output again.

As described above, the present embodiment does not perform the repetition of a boosting operation and an inverting operation during a fixed period, but performs the switching control so that the rate of the boosting operations and the inverting operations is automatically changed according to the levels of the output voltages Vout1 and Vout2, i.e. the relative heaviness of loads, at each occasion.

Figure 4:
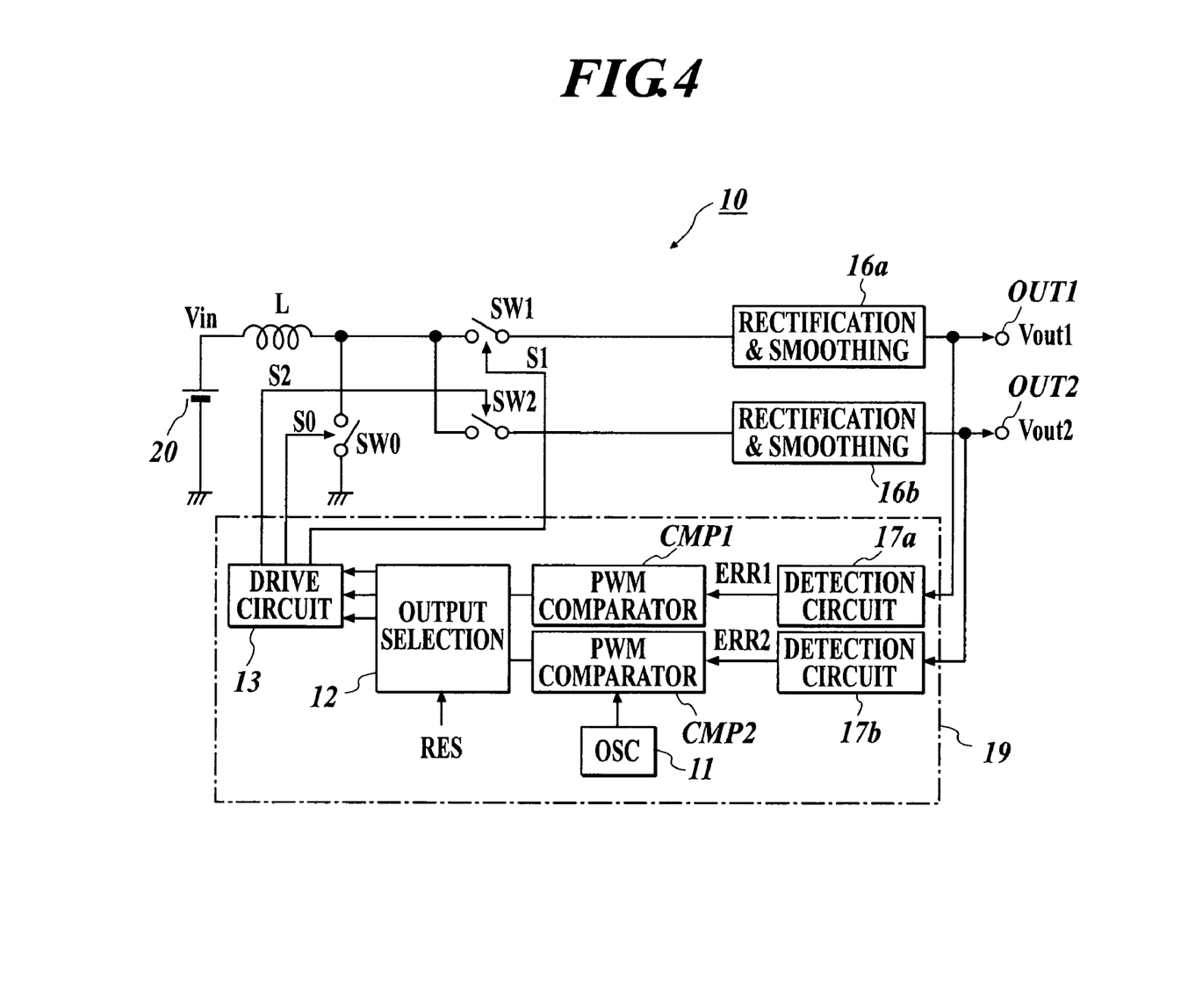
FIG. 4 is a configuration diagram showing a multi-output type DC/DC converter of a second embodiment of the present invention.

FIG. 4 is a configuration diagram showing a multi-output type DC/DC converter of a second embodiment of the present invention.

The multi-output type DC/DC converter 10 of the embodiment is a boost & boost converter including a reactor L, a switch SW0 provided between the reactor L and the ground, which switch SW0 intermittently applies an input voltage Vin to the reactor L by the on-off action of the switch SW0 to accumulate energy in the reactor L, a first rectification & smoothing circuit 16*a* provided between the reactor L and a first output terminal OUT1, a second rectification & smoothing circuit 16*b* provided between the reactor L and the second output terminal OUT2, a switch SW1 connected between the reactor L and the first rectification & smoothing circuit 16*a*, and a switch SW2 connected between the reactor L and a second rectification & smoothing circuit 16*b*. Furthermore, the multi-output type DC/DC converter 10 includes a first detection circuit 17*a* detecting a first output voltage Vout1, a second detection circuit 17*b* detecting a second output voltage Vout2, a signal generation circuit 11 generating a triangular wave TAW having a predetermined frequency and a reset, PWM comparators CMP1 and CMP2 comparing the generated triangular wave with outputs ERR1 and ERR2 of the detection circuits 17*a* and 17*b* to generate PWM control pulses P1 and P2, respectively, an output selection circuit 12 selecting an output pulse that has risen earlier between the outputs of the comparators CMP1 and CMP2 to generate a signal for performing the on-off control of the switches SW0-SW2 in response to the selected pulse, and a drive circuit 13 generating on-off drive signals S0-S2 in response to the control signal from the output selection circuit 12 to apply the generated drive signals S0-S2 to the switches SW0-SW2, respectively. The output detection circuits 17*a* and 17*b*, the PWM comparators CMP1 and CMP2, the triangular wave generation circuit 11, the output selection circuit 12, and the drive circuit 13 constitute a switching control circuit 19.

Each of the rectification & smoothing circuits 16*a* and 16*b* can be constructed of a diode connected between the reactor L and each of the output terminals OUT1 and OUT2 in the forward direction, and a smoothing capacitor connected between the cathode side terminal of the diode and the ground. Each of the detection circuits 17a and 17b can be constructed of a resistance voltage dividing circuit performing the voltage division of each of the output voltages Vout1 and Vout2, respectively, and an error amplifier circuit comparing the divided voltage with a predetermined reference voltage to output a voltage according to the electric potential difference.

The DC/DC converter 10 of the embodiment turns on the switch SW1 to accumulate energy into the reactor L, and turns off the switch SW1 and turns on any one of the switches SW1 and SW2 to output the boosted voltages Vout1 and Vout2 to the output terminals OUT1 and OUT2, respectively. Also the present embodiment is configured to select the output pulse that has earlier risen between the outputs P1 and P2 of the PWM comparators CMP1 and CMP2, respectively, with the output selection circuit 12, and to generate the on-off control signals of the switches SW0-SW2 according to the selected pulse to output the on-off drive signals S0-S2 of the switches SW0-SW2, respectively, with the drive circuit 13.

Thereby, the present embodiment does not repeat a boosting operation and an inverting operation at a fixed period, but performs switching control so that the rate between the boosting operations and the inverting operations automatically changes according to the levels of the output voltages Vout1 and Vout2, i.e. the relative heaviness of loads, at each occasion.

Figure 5:
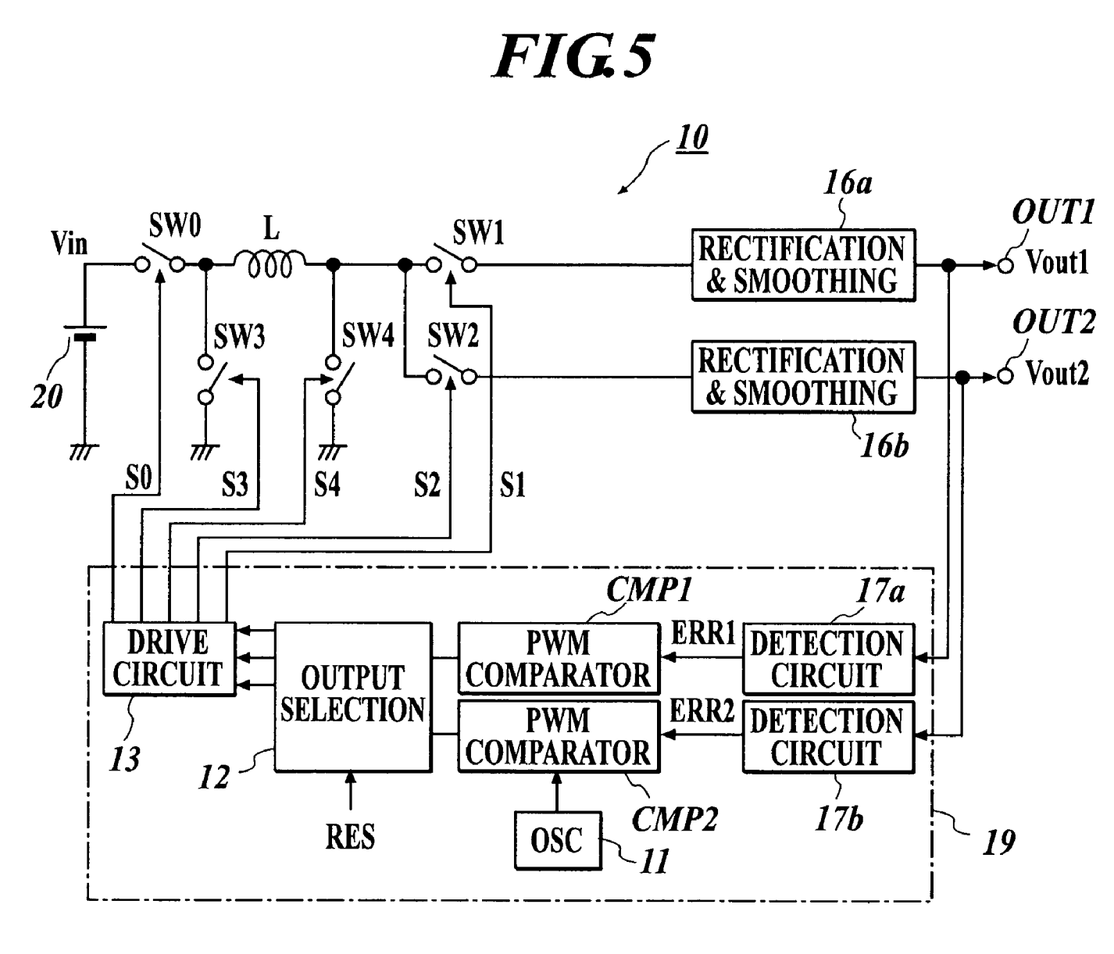
FIG. 5 is a configuration diagram showing a multi-output type DC/DC converter of a third embodiment of the present invention.

FIG. 5 is a configuration diagram showing a multi-output type DC/DC converter of a third embodiment of the present invention.

The multi-output type DC/DC converter 10 of the embodiment is a boost & step-down converter including a reactor L, a switch SW0 provided between a direct-current power supply 20 and the ground, and the reactor L, which switch SW0 intermittently applies an input voltage Vin to the reactor L by the on-off action of the switch SW0 to accumulate energy in the reactor L, a switch SW3 provided between one terminal of the reactor L and the ground, a switch SW4 provided between the other terminal of the reactor L and the ground, a switch SW1 connected between the reactor L and a first rectification & smoothing circuit 16a, and a switch SW2 connected between the reactor L and a second rectification & smoothing circuit 16b.

The multi-output type DC/DC converter 10 of the embodiment can output a voltage obtained by boosting the input voltage Vin to the output terminal OUT1, and can output a voltage obtained by stepping down the input voltage Vin to the output terminal OUT2, by changing the timing of the switches SW0-SW4. Moreover, because the output selection circuit 12 selects the output pulse that has earlier risen between the outputs P1 and P2 of the PWM comparators CMP1 and CMP2, respectively, and generates the on-off control signals of the switches SW0-SW4 according to the selected pulse, the boosting operation on the side of the output terminal OUT1 and the stepping down operation on the side of the output terminal OUT2 are not repeated at a fixed period, but switching control is performed so that the rate between the boosting operations on the side of the output terminal OUT1 and the stepping down operations on the side of the output terminal OUT2 automatically changes according to the relative heaviness of loads.

Figure 6:
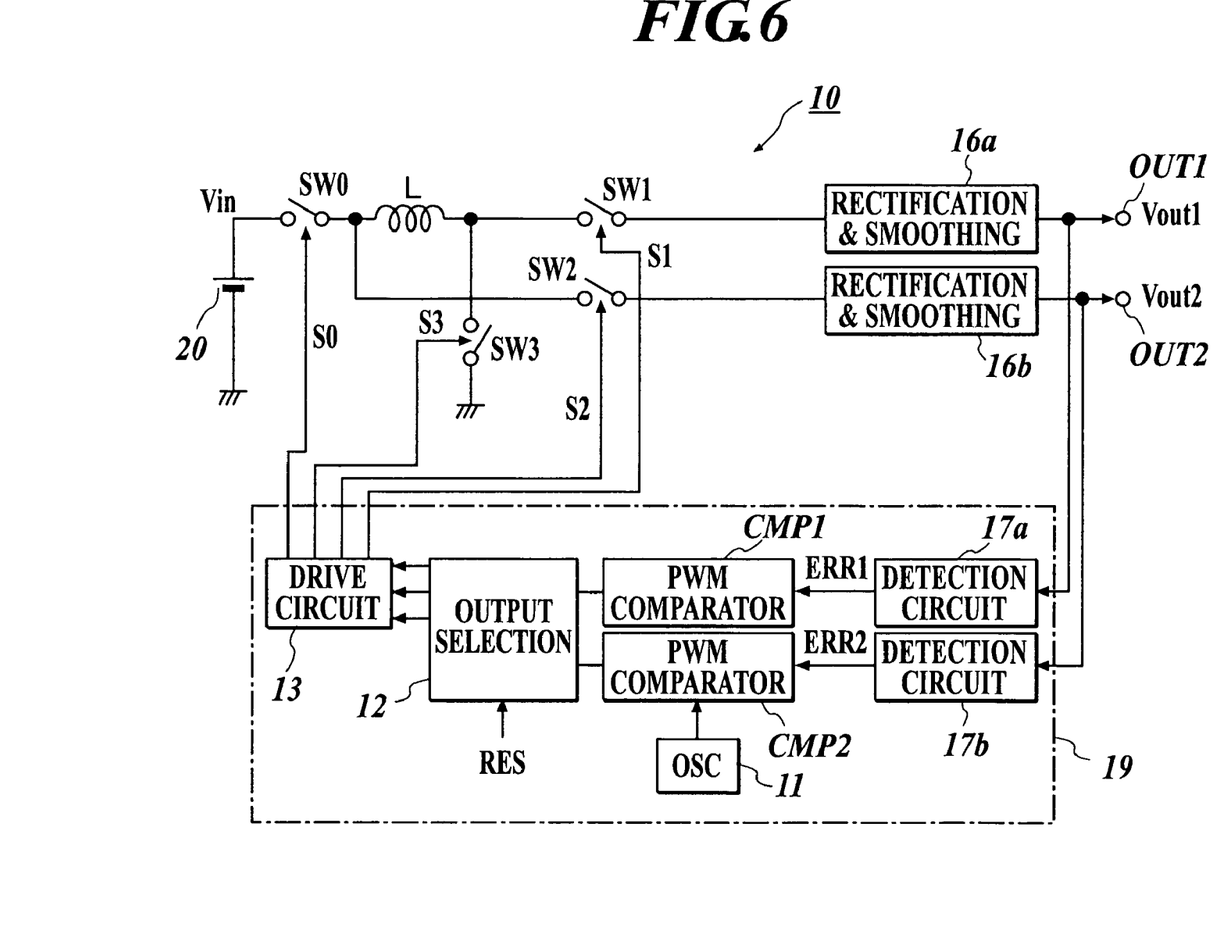
FIG. 6 is a configuration diagram showing a multi-output type DC/DC converter of a fourth embodiment of the present invention.

FIG. 6 is a configuration diagram showing a multi-output type DC/DC converter of a fourth embodiment of the present invention.

The multi-output type DC/DC converter 10 of the embodiment is a boost & inverting converter including a reactor L, a switch SW0 provided between a direct-current power source 20 and the reactor L, which switch SW0 intermittently applies an input voltage Vin to the reactor L by the on-off action of the switch SW0 to accumulate energy in the reactor L, a switch SW3 provided between the other terminal of the reactor L and the ground, a switch SW1 connected between the reactor L and a first rectification & smoothing circuit 16a, and a switch SW2 connected between the reactor L and a second rectification & smoothing circuit 16b.

The multi-output type DC/DC converter 10 of the embodiment can output a voltage obtained by boosting the input voltage Vin to the output terminal OUT1, and can output a negative voltage obtained by inverting the input voltage Vin to the output terminal OUT2, by changing the timing of the switches SW0-SW3. Moreover, because the output selection circuit 12 selects the output pulse that has earlier risen between the outputs P1 and P2 of the PWM comparators CMP1 and CMP2, respectively, and generates the on-off control signals of the switches SW0-SW3 according to the selected pulse, the boosting operation on the side of the output terminal OUT1 and the inverting operation on the side of the output terminal OUT2 are not repeated at a fixed period, but switching control is performed so that the rate between the boosting operations on the side of the output terminal OUT1 and the inverting operations on the side of the output terminal OUT2 automatically changes according to the relative heaviness of loads.

Figure 7:
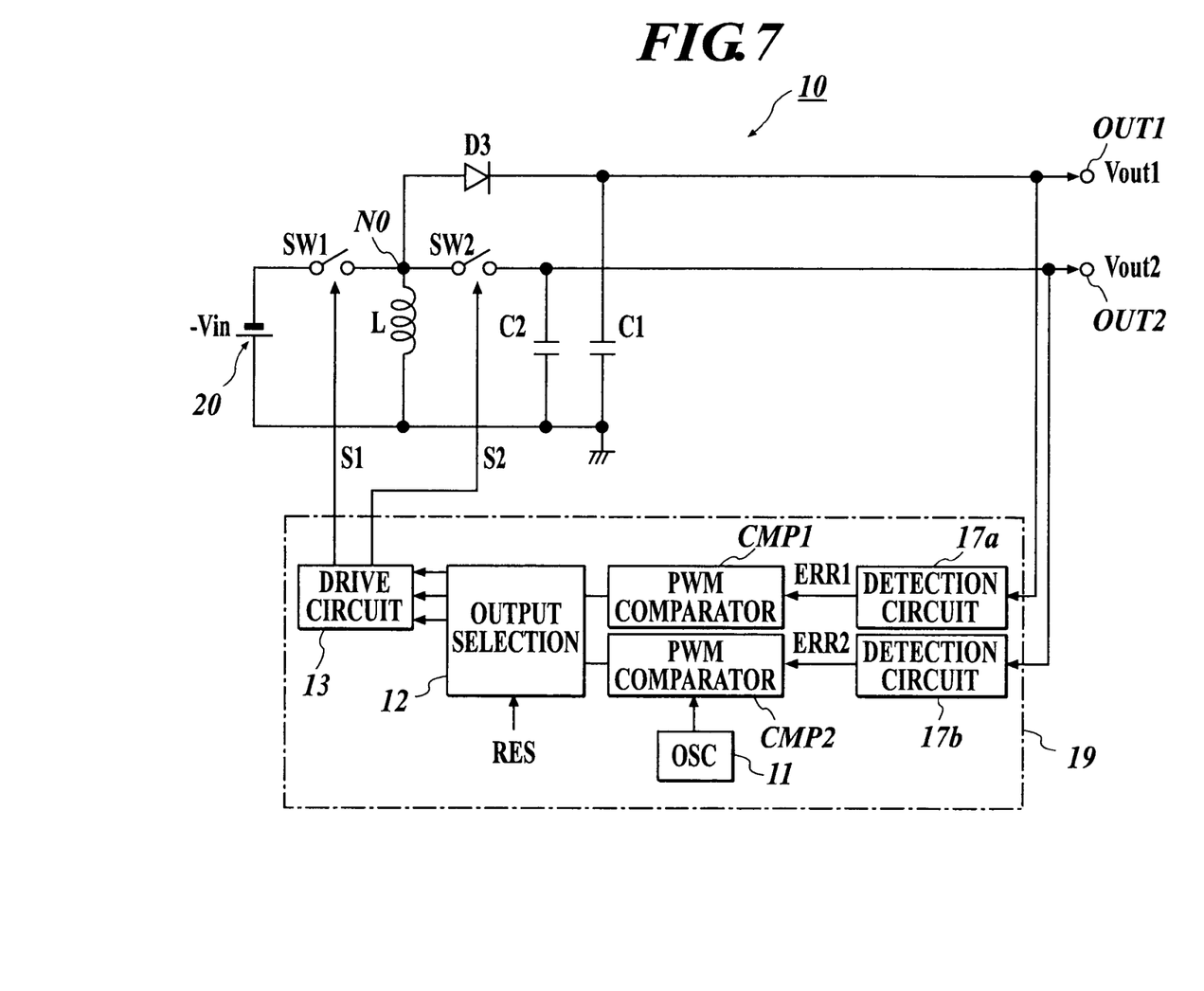
FIG. 7 is a configuration diagram showing a multi-output type DC/DC converter of a fifth embodiment of the present invention.

FIG. 7 is a configuration diagram showing a multi-output type DC/DC converter of a fifth embodiment of the present invention.

The multi-output type DC/DC converter 10 of the embodiment is a buck-boost & buck-boost converter including a reactor L, a switch SW1 provided between a direct-current power supply 20 and the reactor L, which switch SW1 intermittently applies an input voltage −Vin to the reactor L by the on-off action of the switch SW1 to apply a backward direction current to the reactor L and to accumulate energy in the reactor L, a diode D3 as a two-terminal switching device, which diode D3 is connected between a connection node NO of the reactor L and the switch SW1 and a first output terminal OUT1 in the forward direction, and a switch SW2 connected between the connection node NO and a second output terminal OUT2.

The multi-output type DC/DC converter 10 of the embodiment turns on the switch SW1 to accumulate energy in the reactor L, and then turns off the switch SW1 and turns on the switch SW2 to supply electric charges to a smoothing capacity C2 on the side of the output terminal OUT2. Then, an output voltage Vout2 boosted or stepped down according to the accumulated energy and the on-time of the switch SW1 is output to the output terminal OUT2. Moreover, when the switches SW1 and SW2 are turned off after the switch SW1 has been turned on to accumulate energy in the reactor L, electric charges are supplied to a smoothing capacity C1 on the side of the output terminal OUT1, or an output voltage Vout1 boosted or stepped down according to the off-time of the switches SW1 and SW2 is output to the output terminal OUT1.

Figure 8:
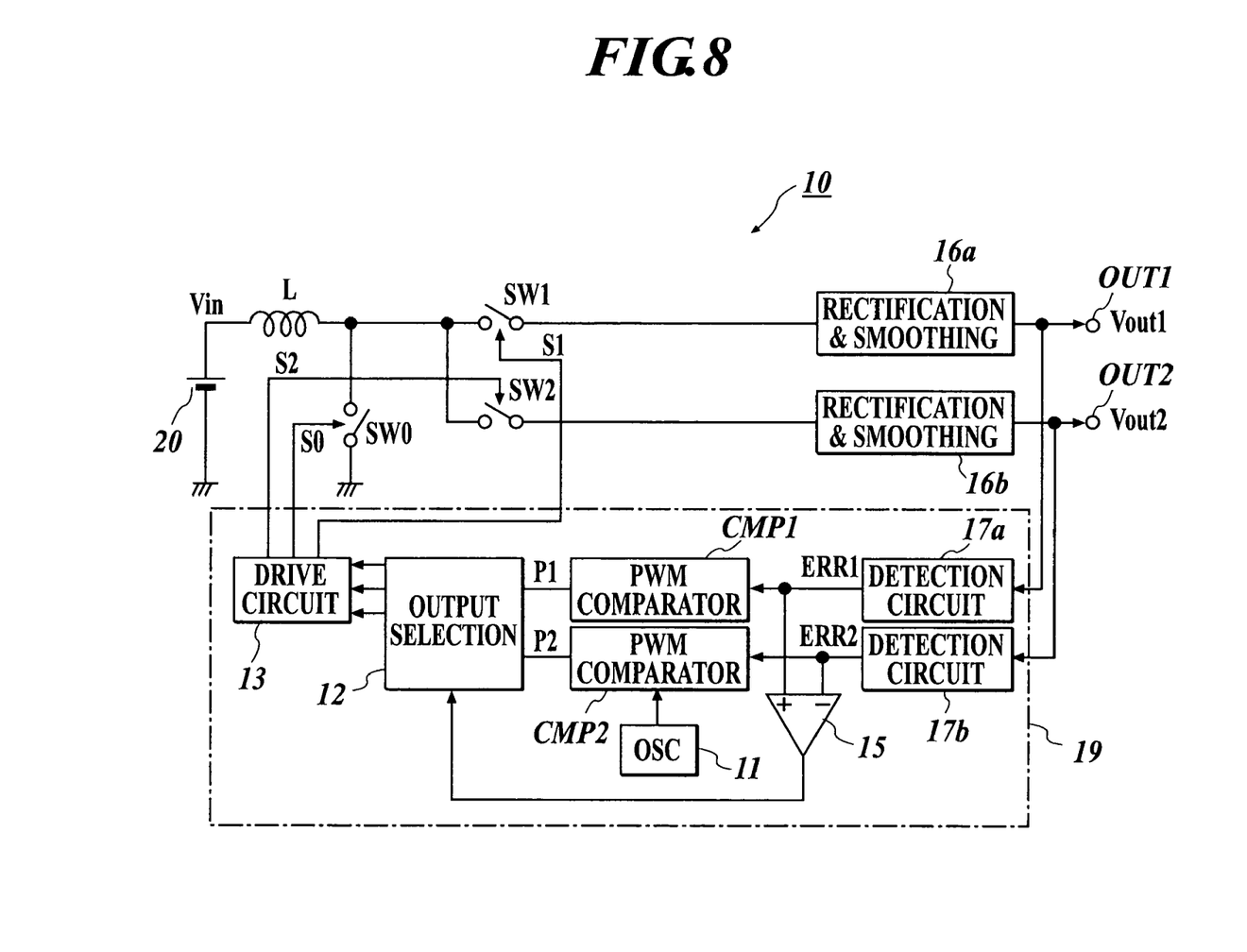
FIG. 8 is a configuration diagram showing a multi-output type DC/DC converter of the other embodiment of the present invention.

Incidentally, the present invention is not limited to the above embodiments, but various modifications can be performed. For example, although in the above embodiments a PWM pulse is severally selected based on which output pulse has been input earlier from the PWM comparators CMP1 and CMP2 into the output selection circuit 12, the multi-output type DC/DC converters of the embodiments may be severally configured to be provided with, for example, a comparator 15 comparing the output voltages of detection circuits (error amplifier circuits AMP1 and AMP2) to judge which output voltage is higher, or whether the difference of the output voltages is more than a predetermined electric potential difference or less than the predetermined electric potential difference, as shown in FIG. 8, and to select a PWM pulse with the output selection circuit according to the judgment result.

Moreover, although the above embodiments use a triangular wave having predetermined inclinations severally in the rise thereof and in the fall thereof as a waveform signal of a predetermined frequency compared in the PWM comparators CMP1 and CMP2, a saw-tooth wave which has a predetermined inclination only in the rise thereof may be used. Moreover, although different voltages (Vref1 and Vref2) are severally used as the reference voltages of the error amplifier circuits AMP1 and AMP2 in the embodiments, the same reference voltage can be used by appropriately setting the ratio of the divided resisters R1 and R2 and the ratio of the divided resistors R3 and R4.

Moreover, in the embodiments, the examples of two-outputs type DC/DC converters have been shown, it is also possible to deal with three outputs or more by increasing the number of the output terminals and the number of the change-over switches. Moreover, in the fifth embodiment (FIG. 7), the diode D3, which is the two-terminal switch device, is used as the switch for applying the current of the reactor to the first output terminal OUT1, but a three-terminal switch device such as a transistor, which is turned on and off in accordance with a control signal, may be used. In addition, also the circuits such as the detection circuits of the output voltages and the oscillation circuit are not limited to the concretely shown ones in the embodiments, and the circuits can be suitably changed without departing from the sprit and the scope of the present invention.

According to an embodiment of the invention, a multi-output type DC/DC converter comprises: a reactor connected to a direct-current power supply; a first switching circuit composed of one or two switches or more to apply a current to the reactor; a second switching circuit composed of one or two switches or more to switch an output from the reactor to any one of a plurality of output terminals; a plurality of output voltage detection sections to detect voltages of the plurality of output terminals; a plurality of comparison circuits to compare outputs of the plurality of output voltage detection sections with a waveform signal of a predetermined frequency; and an output selection circuit to receive outputs of the plurality of comparison circuits as inputs, and to select an output of a comparison circuit, the output having the earliest rise or the earliest fall, so as to generate a control signal pertaining to on and off of the first switching circuit and/or the second switching circuit, wherein a current generated by a discharge of energy accumulated in the reactor is output to any one of the plurality of output terminals in accordance with the control signal generated by the output selection circuit. The currents output from the output terminals hereupon include not only positive currents, i.e. discharge currents, but also negative currents, i.e. drawing currents.

According to such a configuration, the repetition of the operations of boosting and stepping down is not performed at a fixed period in each output, but the switching control of automatically changing the rate between the operations of boosting and stepping down according to the levels of the output voltages, i.e. the relative heaviness of loads, at each time, is led to be performed. Consequently, it becomes possible to prevent the output voltages from greatly shifting from the desired electric potentials owing to load fluctuations, and to output stable direct-current voltages.

Hereupon, it is desirable that the output selection circuit includes: a plurality of flip-flop circuits provided correspondingly to the plurality of comparison circuits, states of the flip-flop circuits being changed by rises or falls of the outputs of the plurality of comparison circuits; and a plurality of logic gate circuits, when a state of any one of the plurality of flip-flop circuits is changed, to prevent changes of the outputs of the comparison circuits corresponding to the other flip-flop circuits from being transferred to the other flip-flop circuits. The configuration enables the sure selection of an output having the earliest rise or the earliest fall among the outputs of the plurality of comparison circuits with a comparatively simple circuit, and enables the generation of the signals for switching control.

Moreover, the waveform signal of the predetermined frequency is a triangular wave and the plurality of flip-flop circuits are configured to be reset by a signal changing in synchronization with a changing point of the triangular wave. The flip-flop circuits the states of which have been changed by the outputs of the comparison circuits are needed to be reset for the judgment at the next cycle. By forming the reset signals for that sake to be the signals synchronized with changing points of the triangular wave, the reset signals can be easily generated.

Furthermore, each of the plurality of output voltage detection sections is an error amplifier circuit to output a voltage according to an electric potential difference between a voltage obtained by resistance division of each of the voltages of the plurality of output terminals and a predetermined reference voltage. Each of the plurality of comparison circuits is a comparator to compare an output of the error amplifier circuit with the waveform signal of the predetermined frequency to output a pulse signal having a pulse width according to an output voltage of the error amplifier circuit. Because the error amplifier circuits and the PWM comparators are the ones that have been generally used in conventional switching power supply circuits, it is possible to configure a DC/DC converter performing desired operations without performing drastic design changes by using these error amplifier circuits and PWM comparators.

Moreover, the first switching circuit includes a first switch provided between an input point to which a voltage from the direct-current power source is applied and a first side terminal of the rector, and a second switch provided between a second side terminal of the reactor and a reference electric potential point of the circuit, and the second switching circuit includes the second switch, and a diode connected between the first side terminal of the rector and any one of the plurality of output terminals in a backward direction. By this, it is possible to realize the DC/DC converter capable of outputting a boosted voltage and an inverted voltage (negative voltage) herewith in the comparatively small number of devices.

Furthermore, the multi-output type DC/DC converter further comprises a drive circuit to output a signal to cause the first switching circuit to drive on and off and a signal to cause the second switching circuit to drive on and off based on the control signal generated by the output selection circuit. Because the switch for applying the current to the reactor has a large size, a comparatively large driving force is needed for turning on and off the switch. Consequently, by providing the drive circuit at the subsequent stage of the output selection circuit, the sizes of the devices constituting the output selection circuit can be made to be small, and the total circuit area can be made to be small.

As described above, according to the present invention, there can be obtained the advantage that output voltages can be prevented from being greatly shifted from desired electric potentials owing to load fluctuations to enable to output stable direct-current voltages in a multi-output type DC/DC converter that intermittently applies an input voltage to a reactor to allow a current to flow through the reactor, and that distributes the output from the reactor to a plurality of output terminals by a time division method to perform the output of a plurality of voltages.

The entire disclosure of Japanese Patent Application No. 2006-121593 filed on Apr. 26, 2006, including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A multi-output type DC/DC converter comprising:
a reactor connected to a direct-current power supply;
a first switching circuit composed of one or two switches or more to apply a current to the reactor;
a second switching circuit composed of one or two switches or more to switch an output from the reactor to any one of a plurality of output terminals;
a plurality of output voltage detection sections to detect voltages of the plurality of output terminals;
a plurality of comparison circuits to compare outputs of the plurality of output voltage detection sections with a waveform signal of a predetermined frequency; and
an output selection circuit to receive outputs of the plurality of comparison circuits as inputs, and to select an output of a comparison circuit, the output having the earliest rise or the earliest fall, so as to generate a control signal pertaining to on and off of the first switching circuit and/or the second switching circuit, wherein
a current generated by a discharge of energy accumulated in the reactor is output to any one of the plurality of output terminals in accordance with the control signal generated by the output selection circuit.

2. The multi-output type DC/DC converter according to claim 1, wherein the output selection circuit includes:
a plurality of flip-flop circuits provided correspondingly to the plurality of comparison circuits, states of the flip-flop circuits being changed by rises or falls of the outputs of the plurality of comparison circuits; and
a plurality of logic gate circuits, when a state of any one of the plurality of flip-flop circuits is changed, to prevent changes of the outputs of the comparison circuits corresponding to the other flip-flop circuits from being transferred to the other flip-flop circuits.

3. The multi-output type DC/DC converter according to claim 2, wherein the waveform signal of the predetermined frequency is a triangular wave and the plurality of flip-flop circuits are configured to be reset by a signal changing in synchronization with a changing point of the triangular wave.

4. The multi-output type DC/DC converter according to claim 1, wherein each of the plurality of output voltage detection sections is an error amplifier circuit to output a voltage according to an electric potential difference between a voltage obtained by resistance division of each of the voltages of the plurality of output terminals and a predetermined reference voltage.

5. The multi-output type DC/DC converter according to claim 4, wherein each of the plurality of comparison circuits is a comparator to compare an output of the error amplifier circuit with the waveform signal of the predetermined frequency to output a pulse signal having a pulse width according to an output voltage of the error amplifier circuit.

6. The multi-output type DC/DC converter according to claim 1, wherein
the first switching circuit includes a first switch provided between an input point to which a voltage from the direct-current power source is applied and a first side terminal of the rector, and a second switch provided between a second side terminal of the reactor and a reference electric potential point of the circuit, and
the second switching circuit includes the second switch, and a diode connected between the first side terminal of the rector and any one of the plurality of output terminals in a backward direction.

7. The multi-output type DC/DC converter according to claim 6, further comprising a drive circuit to output a signal to cause the first switching circuit to drive on and off and a signal to cause the second switching circuit to drive on and off based on the control signal generated by the output selection circuit.

* * * * *